(12) United States Patent  
Chang et al.

(10) Patent No.: US 7,016,410 B2  
(45) Date of Patent: Mar. 21, 2006

(54) ADAPTIVE BIT RATE ALLOCATION

(75) Inventors: Michael Chang, San Jose, CA (US);  
Ying-Ming Wang, Cupertino, CA (US);  
Tai Jing, Mountain View, CA (US)

(73) Assignee: ESS Technology, Inc., Fremont, CA (US)

(*) Notice: Subject to any disclaimer, the term of this patent is extended or adjusted under 35 U.S.C. 154(b) by 603 days.

(21) Appl. No.: 10/226,531

(22) Filed: Aug. 23, 2002

(65) Prior Publication Data

US 2004/0037356 A1 Feb. 26, 2004

(51) Int. Cl.  
*H04N 7/12* (2006.01)

(52) U.S. Cl. .................................. 375/240.03

(58) Field of Classification Search ........... 375/240.02, 375/240.03, 240.05, 240.07; 348/419.1; 382/251

See application file for complete search history.

(56) References Cited

U.S. PATENT DOCUMENTS

| | | | | |
|---|---|---|---|---|
| 6,037,987 A | * | 3/2000 | Sethuraman | 375/240.03 |
| 6,266,375 B1 | * | 7/2001 | Chang et al. | 375/240.03 |
| 6,628,709 B1 | * | 9/2003 | Lin et al. | 375/240.03 |
| 2003/0202580 A1 | * | 10/2003 | Noh et al. | 375/240.03 |

* cited by examiner

*Primary Examiner*—Vu Le  
(74) *Attorney, Agent, or Firm*—Farjami & Farjami LLP

(57) ABSTRACT

A method for determining quantization numbers for each macro block in one video segment having a prescribed capacity is disclosed. The quantization numbers determine how much data will be preserved for that macro block. The method begins by determining a level of complexity for each macro block. Next, initial quantization numbers are chosen for the macro blocks by choosing the largest values possible without exceeding the prescribed capacity of the video segment. Final quantization numbers are selected based on respective ones of the initial quantization numbers proportioned according to the level of complexity for that macro block. The final quantization numbers may be increased or decreased so that the capacity of the video segment is maximized but not exceeded.

20 Claims, 9 Drawing Sheets

| DIF blocks | H0,j | SC0,j | SC1,j | VA0,j | VA1,j | VA2,j |
|---|---|---|---|---|---|---|

| A0,i | V0,i | V1,i | V2,i | V3,i | V4,i | V5,i | V6,i | V7,i | V8,i | V9,i | V10,i | V11,i | V12,i | V13,i | V14,i |
|---|---|---|---|---|---|---|---|---|---|---|---|---|---|---|---|
| A1,i | V15,i | V16,i | V17,i | V18,i | V19,i | V20,i | V21,i | V22,i | V23,i | V24,i | V25,i | V26,i | V27,i | V28,i | V29,i |
| A2,i | V30,i | V31,i | V32,i | V33,i | V34,i | V35,i | V36,i | V37,i | V38,i | V39,i | V40,i | V41,i | V42,i | V43,i | V44,i |
| A3,i | V45,i | V46,i | V47,i | V48,i | V49,i | V50,i | V51,i | V52,i | V53,i | V54,i | V55,i | V56,i | V57,i | V58,i | V59,i |
| A4,i | V60,i | V61,i | V62,i | V63,i | V64,i | V65,i | V66,i | V67,i | V68,i | V69,i | V70,i | V71,i | V72,i | V73,i | V74,i |
| A5,i | V75,i | V76,i | V77,i | V78,i | V79,i | V80,i | V81,i | V82,i | V83,i | V84,i | V85,i | V86,i | V87,i | V88,i | V89,i |
| A6,i | V90,i | V91,i | V92,i | V93,i | V94,i | V95,i | V96,i | V97,i | V98,i | V99,i | V100,i | V101,i | V102,i | V103,i | V104,i |
| A7,i | V105,i | V106,i | V107,i | V108,i | V109,i | V110,i | V111,i | V112,i | V113,i | V114,i | V115,i | V116,i | V117,i | V118,i | V119,i |
| A8,i | V120,i | V121,i | V122,i | V123,i | V124,i | V125,i | V126,i | V127,i | V128,i | V129,i | V130,i | V131,i | V132,i | V133,i | V134,i |

DIF block number where
$i$ : FSC
$\quad i = 0$ for 25 Mb/s structure
$\quad i = 0,1$ for 50 Mb/s structure
H0,i : DIF block in header section
SC0,i to SC1,i : DIF blocks in subcode section
VA0,i to VA2,i : DIF blocks in VAUX section
A0,i to A8,i : DIF blocks in audio section
V0,i to V134,i : DIF blocks in video section

Fig. 2

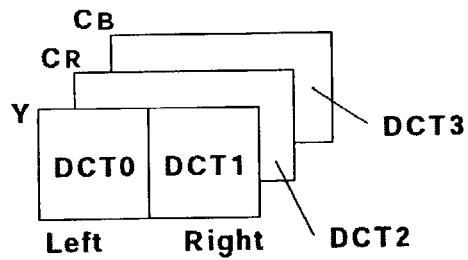
Fig. 3a
Except for the rightmost macro block
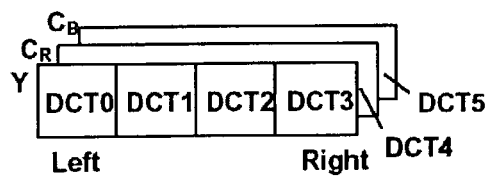
For the rightmost macro block
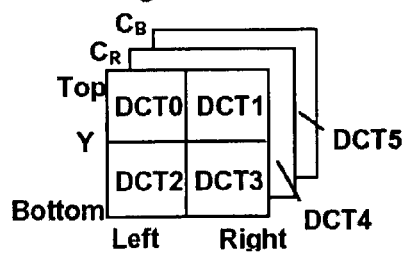
Fig. 3b

Fig. 4

| Compressed macro block number | | Byte position number | | | | | |
|---|---|---|---|---|---|---|---|
| | 3 | 4 — 18 | 18 — 32 | 32 — 46 | 46 — 60 | 60 — 70 | 70 — 79 |
| CM a, 2, k | STA a QNO a | F a, 2, k, 0 | F a, 2, k, 1 | F a, 2, k, 2 | F a, 2, k, 3 | F a, 2, k, 4 | F a, 2, k, 5 |
| CM b, 1, k | STA b QNO b | F b, 1, k, 0 | F b, 1, k, 1 | F b, 1, k, 2 | F b, 1, k, 3 | F b, 1, k, 4 | F b, 1, k, 5 |
| CM c, 3, k | STA c QNO c | F c, 3, k, 0 | F c, 3, k, 1 | F c, 3, k, 2 | F c, 3, k, 3 | F c, 3, k, 4 | F c, 3, k, 5 |
| CM d, 0, k | STA d QNO d | F d, 0, k, 0 | F d, 0, k, 1 | F d, 0, k, 2 | F d, 0, k, 3 | F d, 0, k, 4 | F d, 0, k, 5 |
| CM e, 4, k | STA e QNO e | F e, 4, k, 0 | F e, 4, k, 1 | F e, 4, k, 2 | F e, 4, k, 3 | F e, 4, k, 4 | F e, 4, k, 5 |
| | | Y0 14 bytes | Y1 14 bytes | Y2 14 bytes | Y3 14 bytes | CR 10 bytes | CB 10 bytes | where  $a = (i + 2) \bmod n$
       $b = (i + 6) \bmod n$
       $c = (i + 8) \bmod n$
       $d = (i + 0) \bmod n$
       $e = (i + 4) \bmod n$ i: the vertical order of the super block
   $i = 0, ..., n-1$
n: the number of vertical super blocks in a video frame
   $n = 10$ for the 525/60 system
   $n = 12$ for the 625/50 system
k: the macro block order in the super block
   $k = 0, ..., 26$

| | | | | | | | |
|---|---|---|---|---|---|---|---|
| 0 | 1 | 1 | 1 | 2 | 2 | 2 | 2 |
| 1 | 1 | 1 | 2 | 2 | 2 | 2 | 2 |
| 1 | 1 | 1 | 2 | 2 | 3 | 3 | 3 |
| 1 | 2 | 2 | 3 | 3 | 4 | 4 | 4 |
| 2 | 2 | 2 | 3 | 3 | 4 | 4 | 4 |
| 2 | 2 | 3 | 4 | 4 | 4 | 5 | 5 |
| 2 | 2 | 3 | 4 | 4 | 5 | 5 | 5 |
| 2 | 2 | 3 | 4 | 4 | 5 | 5 | 5 |

8x8 DCT weight table.

Fig. 8

| | | | | | | | |
|---|---|---|---|---|---|---|---|
| 0 | 1 | 1 | | 2 | 2 | 2 | 2 |
| 1 | 1 | 1 | 2 | 2 | 3 | 3 | 3 |
| 2 | 2 | 2 | 3 | 3 | 4 | 4 | 4 |
| 2 | 2 | 3 | 4 | 4 | 5 | 5 | 5 |

| | | | | | | | |
|---|---|---|---|---|---|---|---|
| 0 | 1 | 1 | 1 | 2 | 2 | 2 | 2 |
| 1 | 1 | 1 | 2 | 2 | 3 | 3 | 3 |
| 2 | 2 | 2 | 3 | 3 | 4 | 4 | 4 |
| 2 | 2 | 3 | 4 | 4 | 5 | 5 | 5 |

2x4x8 DCT weight table.

Fig. 9

| IQnew\Qc | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | x | x | x | x | x | x | x | x | x | x | x | x | x | x | x | x |
| 1 | 0.5 | 1 | ∞ | x | x | x | x | x | x | x | x | x | x | x | x | x |
| 2 | x | 0.5 | 1 | 1.5 | ∞ | x | x | x | x | x | x | x | x | x | x | x |
| 3 | x | 0.5 | 0.67 | 1 | 1.33 | 1.67 | x | x | x | x | x | x | x | x | x | x |
| 4 | x | x | 0.5 | 0.75 | 1 | 1.25 | 1.5 | 1.75 | ∞ | x | x | x | x | x | x | x |
| 5 | x | x | 0.5 | 0.6 | 0.8 | 1 | 1.2 | 1.4 | 1.6 | 1.8 | ∞ | x | x | x | x | x |
| 6 | x | x | x | 0.5 | 0.67 | 0.83 | 1 | 1.67 | 1.33 | 1.5 | 1.67 | 1.83 | ∞ | x | x | x |
| 7 | x | x | x | 0.5 | 0.57 | 0.71 | 0.86 | 1 | 1.14 | 1.29 | 1.43 | 1.57 | 1.71 | 1.86 | ∞ | x |
| 8 | x | x | x | x | 0.5 | 0.63 | 0.75 | 0.88 | 1 | 1.13 | 1.25 | 1.38 | 1.5 | 1.63 | 1.75 | ∞ |
| 9 | x | x | x | x | 0.5 | 0.56 | 0.67 | 0.78 | 0.89 | 1 | 1.11 | 1.22 | 1.33 | 1.44 | 1.56 | ∞ |
| 10 | x | x | x | x | x | 0.5 | 0.6 | 0.7 | 0.8 | 0.9 | 1 | 1.1 | 1.2 | 1.3 | 1.4 | ∞ |
| 11 | x | x | x | x | x | 0.5 | 0.55 | 0.64 | 0.73 | 0.82 | 0.91 | 1 | 1.09 | 1.18 | 1.27 | ∞ |
| 12 | x | x | x | x | x | x | 0.5 | 0.58 | 0.67 | 0.75 | 0.83 | 0.92 | 1 | 1.08 | 1.17 | ∞ |
| 13 | x | x | x | x | x | x | 0.5 | 0.54 | 0.62 | 0.69 | 0.77 | 0.85 | 0.92 | 1 | 1.08 | ∞ |
| 14 | x | x | x | x | x | x | x | 0.5 | 0.57 | 0.64 | 0.71 | 0.79 | 0.86 | 0.93 | 1 | ∞ |
| 15 | x | x | x | x | x | x | x | x | x | x | x | x | x | x | x | x |

Fig. 10

ADAPTIVE BIT RATE ALLOCATION

BACKGROUND OF THE INVENTION

1. Field of the Invention

The present invention generally relates to compression techniques and more particularly to a method of determining an optimum quantization number for the compression of video data.

2. Description of the Related Art

There are many standards for the compression and decompression of video data. Some of the standards are the DV-IEC 61834 ("IEC-61834"), DVCPRO 25 and DVCPRO 50 standards. Each of these standards specifies a fixed amount of data for one video frame. Under these standards, as can be seen in FIG. 1, the video frame consists of five layers of structure: (1) micro blocks, (2) macro blocks, (3) DIF blocks, (4) video segments, and (5) DIF sequences.

For the DV-IEC 61834 and the DVCPRO 25 standards, there are a total of ten digital interface format (DIF) sequences for NTSC and 12 DIF sequences for PAL in one video frame. For the DVCPRO 50 standard, there are twice as many DIF sequences (e.g., 20 DIF sequences for NTSC and 24 DIF sequences for PAL). Referring to FIG. 2, there are at least 135 DIF blocks for video data in each DIF sequence. Each video segment of the DIF sequence contains five DIF blocks. Under the DV-IEC 61834, DVCPRO 25 and DVCPRO 50 standards, each DIF block in the video segment has 77 bytes allocated for one macro block. Referring to FIG. 3B, for the DV-IEC 61834 and the DVCPRO 25 standard, each macro block contains six micro blocks—four blocks for Y data, one block for U data, and one block for V data. As can be seen in FIG. 3A, for the DVCPRO 50 standard, each macro block contains four micro blocks—two blocks for Y data, one block for U data, and one block for V data.

Referring to FIG. 4, the structure of the video segment for all the standards is shown. Each of the standards specifies that a video segment has a fixed space of 77×5=385 bytes for compressed video data. An EOB coding is defined for a macro block that has less than 77 bytes in a DIF block. The remaining space can then be used by any of the other four macro blocks in the same video segment.

For each of the standards, every macro block in the video segment can be assigned an individual quantization step which is a factor regarding how much data will be preserved for that particular macro block. The quantization step is determined by three factors: (1) the class number; (2) the area number; and (3) the quantization number (QNO). The class number and the area number are defined in the DV-IEC 61834, DVCPRO 25, and the DVCPRO 50 specifications. However, the QNO can vary depending on the amount of compression that the user wishes. The QNO is chosen from 16 values for each of the five macro blocks. It is desired to choose a value of the QNO for each of the five macro blocks such that the maximum amount of information can be preserved without exceeding the 385 byte capacity limit of the video segment. By choosing the optimum value of the QNO, both the best video frame rate and image quality is achieved. The larger the value of the QNO, the finer the quantization step is and hence the more bits are needed for the encoding.

For the DVC-IEC 61834 and DVCPRO 25 standards, the video frame consists of 270 video segments for NTSC and 324 video segments for the PAL format. For the DVCPRO 50 standard, the video frame consists of 540 video segments for NTSC and 648 video segments for PAL. The video frame rate is 30 frames per second for NTSC and 25 frames per second for PAL. Accordingly, for the DV-IEC 61834 and DVCPRO 25 standards, the processing time for computing the DCT (Discrete Cosine Transform) and QNO searching for a video segment is approximately 123.4 $\mu$sec. For the DVCPRO 50 standard, parallel computation in two groups of 10 DIF sequences for NTSC and 12 DIF sequences for PAL is used to maintain the same 123.4 $\mu$sec processing time for a video block. The DCT computation is well known for compressing the video data and usually only takes about ten percent of the 123.4 $\mu$sec computing time (i.e. about 12.34 $\mu$sec). The remaining time (i.e., 101 $\mu$sec) can be allocated for searching the QNO.

One method of determining the optimum QNO for each of the five macro blocks in the video segment is to do a full search of all the combinations that are possible. Referring to FIG. 5, in step 501, all of the combinations of the QNO are generated. It will be recognized that for five QNO's each having 16 values, the total possible number of combinations for the QNO's is $16^5=1,048,576$ combinations. In this regard, 1,048,576 combinations must be examined in order to preserve the maximum video data while the capacity (i.e., 385 bytes) is not exceeded.

In step 502, each combination of QNO's is compared to the current best combination to determine if the length of the video segment is closer to the maximum value of 375 bytes. If the combination is better than the best combination, then in step 504, the best combination is replaced with the newly discovered best combination. However, if the combination is not better than the best combination, then that combination is discarded in step 506.

If all of the combinations have not been tried, then in step 508, the process returns to step 501 where another of the generated combinations is compared to the best combination. However, if all of the combination have been tried, then the process is finished because the best combination for the QNO's has been found.

A drawback to the method shown in FIG. 5 is that the time to search all 1,048,576 combinations is long. Only a supercomputer would be able to search all combinations in the 101 $\mu$sec allocated for QNO searching. It would not be possible for a desktop computer or other consumer product to search all of the QNO combinations in the allocated time.

Another method of determining the QNO's is to search only pre-selected combinations. Referring to FIG. 6, in step 601, only five pre-selected QNO's out of sixteen are generated. Accordingly, only $5^5=3125$ combinations need to be examined.

In step 602, the combination is compared to the current best combination to determine if the length of the video segment is closer to 375 bytes. If the combination is not better than the current best, then the combination is discarded in step 606. However if the combination is better than the current best, the best combination is replaced with this combination in step 604. If all the combinations have not been tried, then the process in step 608 repeats to step 601 whereby another combination will be compared. However, if all of the 3125 combinations have been tried, then the process is finished. The average search time per combination of QNO's is about 32 ns which is applicable to the processor inside a desktop computer.

The QNO search methods described above do not consider the complexity differences between each macro block of the video segment. The QNO's are determined to be the greatest length without exceeding the prescribed limit. As a result, it is possible that macro blocks with high AC coefficients from the DCT process get small spaces while most spaces are reserved for macro blocks with small AC coefficients. Accordingly, the compressed image quality is deteriorated.

The second problem is the generation of mosquito noise. When a frozen pattern of video for encoding is formatted using the DV-IEC61834, DVCPRO 25 or DVCPRO 50 standard, the digitized video data will have a small variation from frame to frame due to the noise and uncertainty introduced by the analog-to-digital (A/D) converter. Ideally, the same five QNO's should be chosen for every video segment between video frames. However, because the video data varies slightly from frame to frame, a different combination of the five QNO's will be assigned using the above-mentioned search techniques. Accordingly, the position of high and low compressed macro blocks, which are usually along sharp edges, will be altered between the video frames thereby causing noticeable distortion of the video image (i.e., mosquito noise).

In addition to the foregoing, the method using 5 pre-selected QNO's shown in FIG. 6 also has another additional drawback. Specifically, because the pre-selected 5 QNO's are a subset of sixteen QNO's, the flexibility in choosing the best combination is limited. As such, the video encoded by this method will have inferior image quality than the video encoded by the full search method.

The present invention addresses the above-mentioned deficiencies in the prior art methods of determining the quantization of compression by providing a method whereby the optimum quantization number is chosen. In this regard, the present invention provides an adaptive bit rate allocation that only needs to search a limited number of combinations, but can allocate space according to the complexity of each macro block. Accordingly, this method utilizes all 16 QNO's without compromise to deliver the best quality available.

BRIEF SUMMARY OF THE INVENTION

In accordance with the present invention there is provided a method of determining quantization numbers for each macro block in one video segment which has fixed space for compressed video data. The method starts by determining a level of complexity of each individual macro block. Next, an initial quantization number is chosen. A final quantization number is selected based on the initial quantization number that is proportional to the level of complexity of the macro block.

In the preferred embodiment of the present invention, the level of complexity of the macro block is indicated by a complex index that is proportional to the summation of all the complex indexes of discrete cosine transform (DCT) blocks. The complex index of each DCT block is calculated by the summation of weight factors of AC components of a DCT block multiplied by the coefficients of the DCT block. The initial quantization numbers are determined by selecting the greatest initial quantization numbers that do not exceed a prescribed capacity of the video segment. The final quantization numbers can be adjusted in order to maximize the allocation space for macro blocks with high complex indexes in the video segment. In the preferred embodiment of the present invention, the final quantization numbers can be incremented or decremented by one individually until the quantization numbers are just less than the maximum capacity of the video segment.

In accordance with the present invention, there is provided a compressed data stream having at least one macro block and containing at least one quantization number. The quantization number is calculated by first determining a complex index for the macro block wherein the complex index is based on a weight factor of the compressed data stream. Next, an initial quantization number that does not exceed the maximum capacity of the macro block is determined. The initial quantization number is weighted by the complex index in order to generate a weighted quantization number. Finally, the weighted quantization number is adjusted in order to generate the quantization number for the macro block.

BRIEF DESCRIPTION OF THE DRAWINGS

These as well as other features of the present invention will become more apparent upon reference to the drawings wherein:

FIG. 2 is a data structure for a DIF sequence;

FIG. 3a is a macro block structure for the DVCPRO 50 standard;

FIG. 3b is a macro block structure for the IEC-61834 standard or the DVCPRO 25 standard;

FIG. 4 is the structure of a video segment;

FIG. 8 is an 8×8 DCT weight table;

FIG. 9 is a 2×4×8 DCT weight table; and

FIG. 10 is an IQNO/Qi lookup table.

DETAILED DESCRIPTION OF THE INVENTION

Figure 1A:
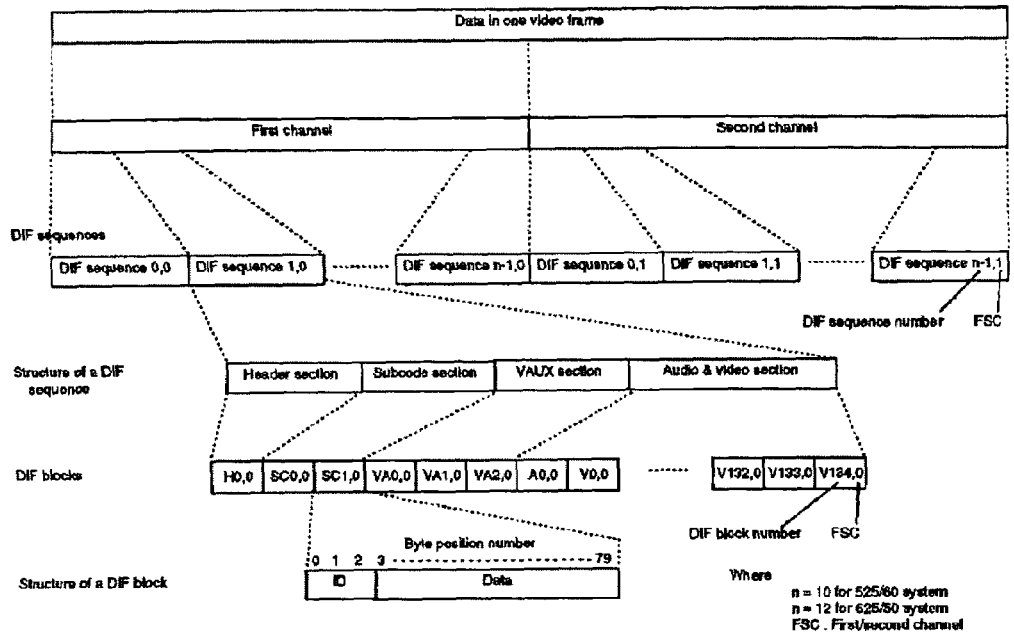
FIG. 1a is a data structure for one video frame for the DVCPRO 50 standard.
Figure 1B:
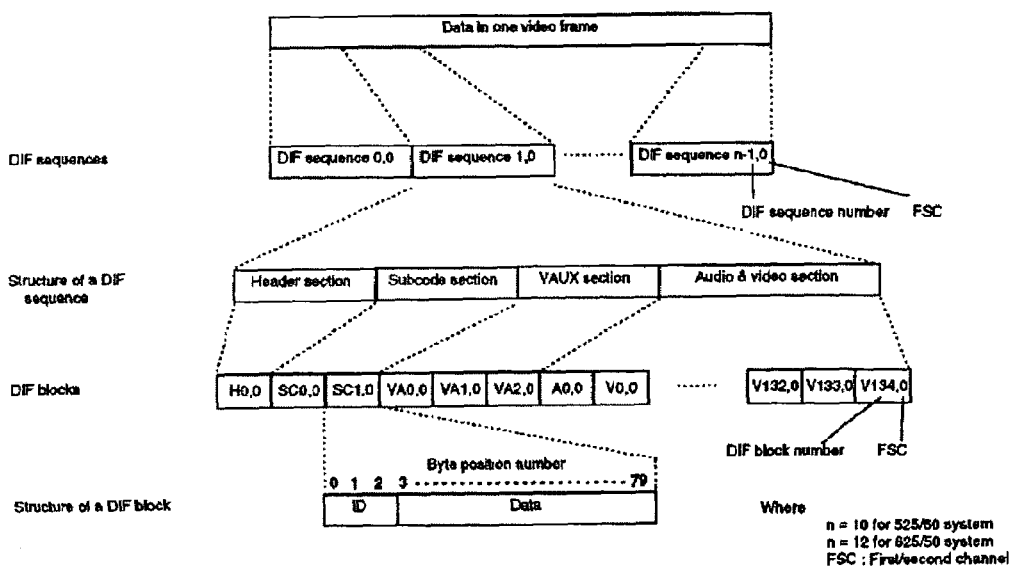
FIG. 1b is a data structure for one video frame for the IEC-61834 standard or the DVCPRO 25 standard.
Figure 5:
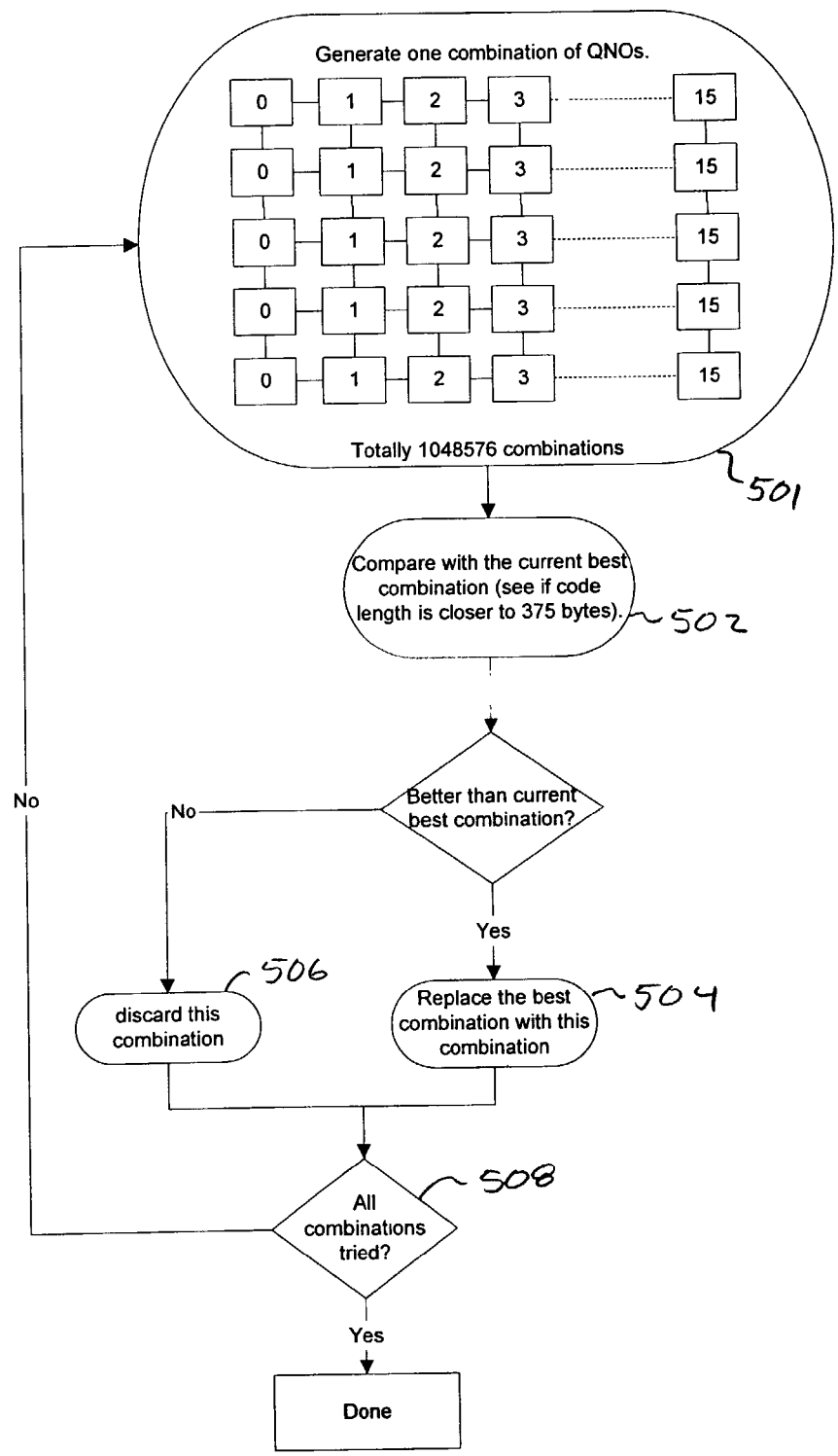
FIG. 5 is a flowchart showing a first prior art method of searching for the quantization numbers.
Figure 6:
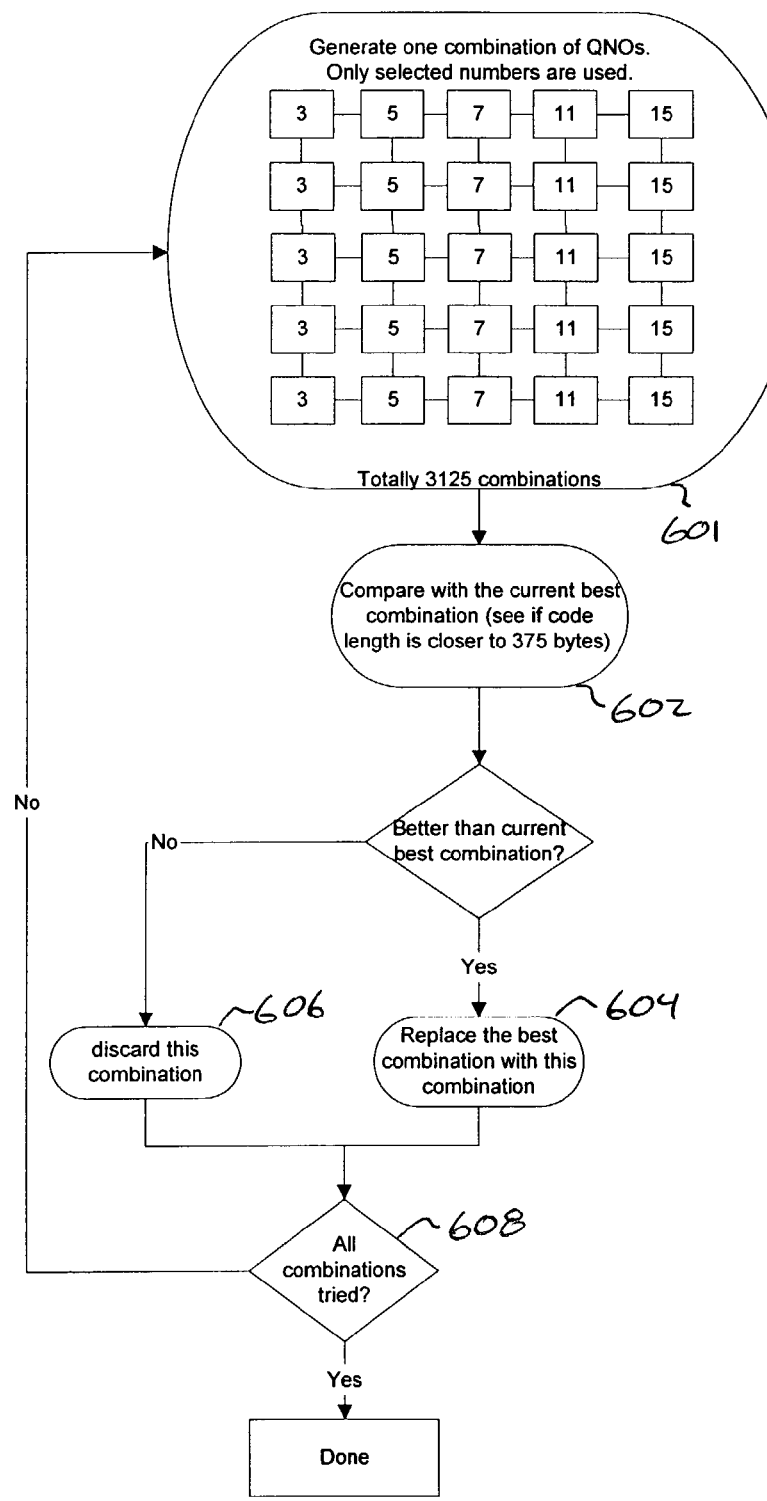
FIG. 6 is a flowchart showing a second prior art method of searching for the quantization numbers.
Figure 7:
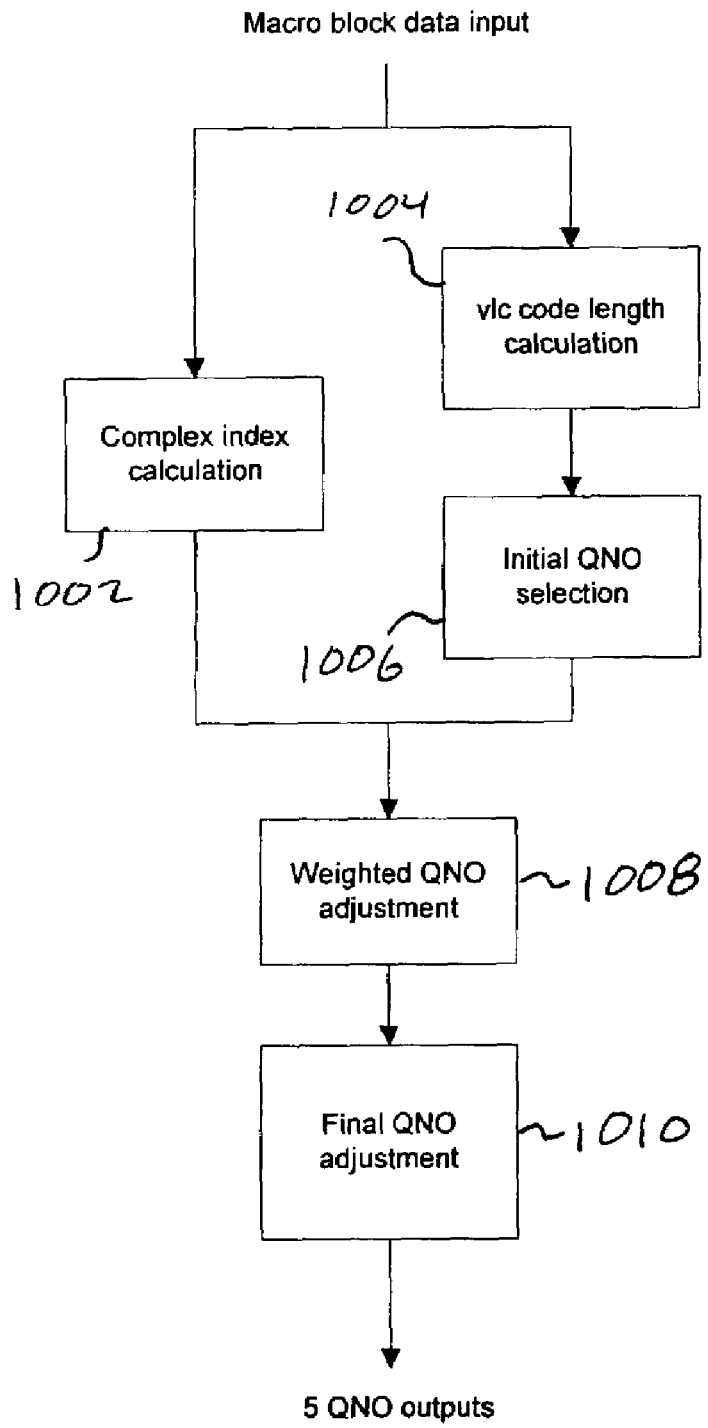
FIG. 7 is a flowchart showing the adaptive bit rate allocation method of the present invention.

Referring to the drawings wherein the showings are for purpose of illustrating a preferred embodiment of the present invention only, and not for purposes of limiting the same, FIG. 7 is a flowchart showing the adaptive bit rate allocation method of the present invention. Generally, an initial QNO is selected to reach maximum capacity usage. Based on the initial QNO, the QNO of each compressed macro block (CM) is selected in proportion to a complex index (CI). A final adjustment is performed to ensure that an optimized result is reached.

Referring to step 1002 of FIG. 7, the process begins by calculating the complex index (CI) for each CM. The CI indicates the level of complexity of each CM. The CI for each CM is calculated as follows:

$$CI_i = \frac{1}{16} \cdot \sum_{k=0}^{KMAX} ci_k \quad (1)$$

where $Ci_k$ is the complex index of each DCT block of the CM. For the IEC-61834 and DVCPRO 25 standards, KMAX is 5 (e.g., 6 blocks in total, 4Y blocks, one Cr block and one Cb block). For the DVCPRO 50 standard, KMAX is 3 (4 blocks in total, 2 Y blocks, one Cr block and one Cb block).

The complex index of each DCT block ci in equation (1) is calculated as follows:

$$ci = \sum_{j=0}^{63} |coef_j| \cdot w_j \quad (2)$$

where $coef_j$ is the DCT coefficient with respect to a certain AC component and $w_j$ is the weight factor for the AC component. The weight factor is obtained through table lookup of AC component weights, as is commonly known. For an 8×8 DCT mode, the table of FIG. 8 is used, but for a 2×4×8 DCT mode the table shown in FIG. 9 is used. From the tables, it can be seen that for larger AC components, the weight factors are also larger. This ensures that the DCT blocks with more AC components have larger CI's.

According to the DV standards (i.e., IEC-61834, DVCPRO 25, DVCPRO 50), the DCT coefficients are 10-bit signed integers (9-bits for the DC coefficient). Because, only the absolute value of the DCT coefficient is used, it can be considered as a 9-bit unsigned integer. The sum of the 8×8 DCT weights from FIG. 8 is 176 and the sum of the 2×4×8 DCT weights from FIG. 9 is 162. Therefore, ci only needs 17 bits (i.e., 9 bits*176). For KMAX=5, the summation of ci needs 20 bits and CI needs 16 bits. For KMAX=3, the summation of ci needs 19 bits and CI needs 15 bits.

Referring to FIG. 7, as the complex index calculation is being processed, the length of the code is being calculated in step 1004 and the initial QNO is being selected in step 1006. The initial QNO is selected as the base of the adjustment and is selected in a manner that by applying to all CM's, the overall length is the longest but does not exceed the capacity. The following subroutine selects the initial QNO:

```
select_init_qno ( ) {
init_qno = 7;
total_length = CM0[init_qno] + CM1[init_qno] + CM2[init_qno] +
            CM3[init_qno] + CM4[init_qno];
If (total_length < Capacity)
    Previous_state = STATE_SMALLER;
Else
    Previous_state = STATE_LARGER;
Done = FALSE;
while (!done) {
    total_length = CM0[init_qno] + CM1[init_qno] +
            CM2[init_qno] + CM3[init_qno] + CM4[init_qno];
    if(total_length < Capacity) { /* Smaller. Increase init_qno */
        if(init_qno == MAX_QNO) break;
        if(previous_state == STATE_SMALLER) {
            init_qno++;
            previous_state = STATE_SMALLER;
        }
        else /*Increase init_qno will cause total length to exceed
            capacity. We're done.*/
            done = TRUE;
    }
    else if(total_length > num_bits_per_vs)
    { /* Larger. Decrease init_qno */
        if(init_qno == MIN_QNO) break;
        if(previous_state == STATE_LARGER) {
            init_qno--;
            previous_state = STATE_LARGER;
        }
        else { /*The next smaller init_qno can satisfy the
            capacity limitation*/
            init_qno--;
            done = TRUE;
        }
    }
    else { /* The size is just the same as the capacity */
        done = TRUE;
    }
  }
}
```

If MAX_QNO (15) or MIN_QNO (0) is used by initial QNO, then the best value has been found and the process stops. However, if MAX_QNO (15) or MIN_QNO (0) is not used as the initial QNO, then the best value has not been found and the process continues to step 1008 in FIG. 7.

Based on the initial QNO and the CI of each CM, a weighted QNO is used by each CM. The weighted QNO ($Q_i$) is calculated as follows:

$$Q_i = IQNO \cdot \frac{5CI_i}{\sum CI} \quad (3)$$

where Qi is the weighted QNO of macroblock (i=0 to 4), IQNO is the initial QNO determined from the subroutine, $CI_i$ is the complex index of macroblock i from equation (1) and ΣCI is the sum of all 5 CI's. As previously explained above, both $5CI_i$ and ΣCI are stored using 19 bits (i.e., 20 bits−4+3).

A design limit exists on the QNO selection so that it is not less than 0.5*IQNO and does not exceed 2*IQNO. If QNO is larger than 2*IQNO, then 2*IQNO is used. If QNO is smaller than 0.5*IQNO, then 0.5*IQNO is used. There are two reasons for the limit. First of all, if the five QNOs in a video segment differ too much, it impairs the resulting image quality by empirical observation. Secondly, by limiting the selection of the QNO to the above-mentioned values, a very good set of QNO values will be chosen in a reasonable amount of time.

The arithmetic division in equation (3) is costly to implement in hardware. However, it can be replaced with a series of shift-and-add operations. For example, because QNO cannot exceed 2*IQNO and if $5CI_i$ is greater than or equal to twice ΣCI, then $Q_i$ is 2*IQNO. To determine if $5CI_i>=2*ΣCI$, an easy shift-and-compare operation can be performed. Similarly, if $5CI_i<=0.5*ΣCI$, then $Q_i$ is assigned 0.5*IQNO.

For the cases where $5CI_i$ is between 0.5*ΣCI and 2*ΣCI, then the table of FIG. 10 can be used. The table of FIG. 10 is an IQNO/$Q_i$ lookup table and lists all the possible relationships between $Q_i$, IQNO, and $5CI_i/ΣCI$. For example, if IQNO is 3 and $5CI_i/ΣCI$ is smaller than 1.33 but greater than 1, then $Q_i$ is 4. The locations in the table with an "x" indicate impossible cases wherein $Q_i$ is greater then 2*IQNO or smaller than 0.5*IQNO. The values in the table fall in 24 spaces with the step size being ¹⁄₁₆. Therefore, once you know IQNO, it takes up to 24 steps to find the correct value of $Q_i$. In this case, searching was started from the middle of the searching range and continues to the left or right direction depending if the initial value was larger or smaller. This reduces the maximum search steps to 12.

The result of the weighted adjustment allocates each CM according to its complexity, but does not guarantee that that the overall size is the maximum and within the capacity. As such some further adjustment is needed. Referring to FIG. 7, in step 1010, the weighted QNO is adjusted to fulfill size requirements. Specifically, when the overall size of the QNO's is smaller than capacity, then the smallest QNO is increased by 1. If the size is still smaller, then the second smallest QNO is increased by one. If after increasing all five QNO's by one, the size is still not at capacity, then the smallest QNO is again increased by one. This procedure is performed until no further increase is possible (i.e., one more increase will make the overall size exceed capacity). If after computing the QNO's, the overall size is above capacity, then the opposite procedure is performed. Namely, the largest QNO is decreased by 1, then the second largest QNO is decreased by 1, etc. . . . The QNO's are decreased by 1 until the overall size is within capacity.

As will be recognized, the maximum number of iterations for the initial QNO (i.e., IQNO) is 7 (when the initial QNO is 0 or 15). The weighted adjustment needs 12 steps in a worst case scenario for each of the 5 CM's to perform in parallel. There is also a natural limit for the final adjustment. For instance, it is not possible for all of the QNO's to be larger or smaller than the initial QNO and that there is a hard limit for the QNO (i.e., the QNO is between 0.5*IQNO and 2*IQNO). For the following worst case example, the weighted adjustment shows:

IQNO=14

QNO={7, 7, 7, 7, 15} (QNO cannot be less than 7, and not all QNO's can be smaller than IQNO).

The maximum possible result will be QNO={14, 15, 15, 15, 15}. If all QNO's where to be 15, then IQNO would have been 15. To reach the final result for QNO, thirty-one iterations are needed for the final adjustment process. As stated before, it took 7 iterations for the initial QNO selection and 12 steps for the weighted adjustment. Accordingly, it took 50 steps (7+12+31=50) to determine the final result for the QNO's in the worst case. As will be recognized, this is greatly reduced from the number of iterations using the prior art methods and achieves a superior result.

Additional modifications and improvements of the present invention may also be apparent to those of ordinary skill in the art. Thus, the particular combination of parts describes and illustrated herein is intended to represent only a certain embodiment of the present invention, and is not intended to serve as a limitation of alternative devices within the spirit and scope of the invention.

What is claimed is:

1. A method for determining quantization numbers for macro blocks in a video segment having a prescribed capacity of compressed data, the method comprising the steps of:
    a) determining a level of complexity of each macro block by determining a complex index for each macro block;
    b) determining an initial quantization number for each macro block; and
    c) selecting a final quantization number for each macro block that is based on the initial quantization number proportioned by the level of complexity of the macro block;
    wherein the complex index ($CI_i$) for each macro block is determined as follows:

$$CI_i = \frac{1}{N} \cdot \sum_{k=0}^{KMAX} ci_k;$$

and $$ci = \sum_{j=0}^{63} |coef_j| \cdot w_j$$

where $w_i$ is the weight factor for the AC components of a respective DCT block, $coef_j$ is a discrete cosine transform coefficient for the DCT block and KMAX and N are integer values.

2. The method of claim 1 wherein N=16, KMAX=5 for a DVCPRO 25 standard and an IEC-6 1834 standard, and KMAX=3 for a DVCPRO 50 standard.

3. The method of claim 1 further comprising the step of determining the weight factors by locating a weight factor in a table of discrete cosine transform AC component weights.

4. The method of claim 1 wherein the initial quantization numbers are determined by selecting the greatest initial quantization numbers that do not exceed the prescribed capacity of the video segment.

5. The method of claim 1 further comprising the step of:
    d) adjusting the final quantization numbers in order to maximize the size of the final quantization numbers without exceeding the prescribed capacity of the video segment.

6. The method of claim 5 wherein the final quantization numbers are increased or decreased by one individually in order to maximize the capacity of the macro block.

7. A method for determining quantization numbers for macro blocks in a video segment having a prescribed maximum capacity, the method comprising the steps of:
    a) determining a complex index for each macro block wherein the complex index is based on a summation of all complex indexes for each discrete cosine transform (DCT) block for that macro block;
    b) determining initial quantization numbers that do not exceed the prescribed capacity of the video segment;
    c) weighting the initial quantization numbers by a respective one of the complex indexes of each macro block in order to generate weighted quantization numbers; and
    d) adjusting the weighted quantization numbers to not exceed the prescribed capacity of the macro block;
    wherein the complex index ($CI_i$) for each macro block is determined as follows:

$$CI_i = \frac{1}{N} \cdot \sum_{k=0}^{KMAX} ci_k;$$

and $$ci = \sum_{j=0}^{63} |coef_j| \cdot w_j$$

where $w_i$ is the weight factor for the AC components of a respective DCT block, $coef_j$ is a discrete cosine transform coefficient for the DCT block and KMAX and N are integer values.

8. The method of claim 7 wherein the process is used with a DVCPRO 25 standard, a DVCPRO 50 standard and an IEC-6 1834 standard.

9. The method of claim 7 where in step (d) each quantization number is adjusted by incrementing or decrementing individual quantization numbers by one so as to not exceed the prescribed capacity of the video segment.

10. The method of claim 7 wherein N=16, KMAX=5 for a DVCPRO 25 standard and an IEC-6 1834 standard, and KMAX=3 for a DVCPRO 50 standard.

11. The method of claim 7 further comprising the step of determining the weight factors by locating a weight factor in a table of discrete cosine transform AC component weights.

12. The method of claim 7 wherein the weighting of the initial quantization number results in $Q_i$ determined by:

$$Q_i = IQNO \cdot \frac{5CI_i}{\sum CI}$$

where IQNO is the initial quantization number determined in step (b).

13. The method of claim 12 wherein $Q_i$ is determined from a lookup table containing the values of IQNO and a ratio of 5 $CI_i/\Sigma CI$.

14. A video segment embodied in a carrier wave with a prescribed capacity and having at least two macro blocks, the video segment comprising:
  at least two quantization numbers calculated by:
    determining a complex index for each macro block wherein the complex index is based on a complexity of the macro block;
    determining initial quantization numbers for each macro block that do not exceed the maximum capacity of the macro block;
    weighting the initial quantization numbers by the complex index in order to generate weighted quantization numbers; and
    adjusting the weighted quantization numbers so as to not exceed the maximum capacity of the macro block;
  wherein the complex index ($CI_i$) for each macro block is determined as follows:

$$CI_i = \frac{1}{N} \cdot \sum_{k=0}^{KMAX} ci_k; \text{ and}$$

$$ci = \sum_{j=0}^{63} |coef_j| \cdot wi$$

where $w_i$ is the weight factor for the AC components of a respective DCT block, $coef_j$ is a discrete cosine transform coefficient for the DCT block and KMAX and N are integer values.

15. The video segment of claim 14 wherein the video segment conforms to a DVCPRO 25 standard, a DVCPRO 50 standard or an IEC-61834 standard.

16. The video segment of claim 14 wherein the weight factors of the AC components are determined from a look-up table of AC component weights.

17. The video segment of claim 14 wherein N=16, KMAX=5 for a DVCPRO 25 standard and an IEC-6 1834 standard, and KMAX=3 for a DVCPRO 50 standard.

18. The video segment of claim 14 wherein the weighting of the initial quantization number is a result $Q_i$ given by:

$$Q_i = IQNO \cdot \frac{5CI_i}{\sum CI}$$

where IQNO is the initial quantization number.

19. The video stream of claim 18 wherein $Q_i$ is determined from a lookup table containing the values of IQNO and a ratio of 5 $CI_i/\Sigma CI$.

20. The video stream of claim 17 where the quantization number is adjusted by incrementing or decrementing individual quantization numbers by one so that the maximum capacity of the macro block is not exceeded.

* * * * *

UNITED STATES PATENT AND TRADEMARK OFFICE
CERTIFICATE OF CORRECTION

PATENT NO. : 7,016,410 B2 Page 1 of 1
APPLICATION NO. : 10/226531
DATED : March 21, 2006
INVENTOR(S) : Chang et al.

It is certified that error appears in the above-identified patent and that said Letters Patent is hereby corrected as shown below:

In the claims, column 10, line 7, "wi" should be changed to --$w_j$--.

In the claims, column 10, line 35, "17" should be changed to --14--.

Signed and Sealed this

Tenth Day of April, 2007

JON W. DUDAS
*Director of the United States Patent and Trademark Office*